(12) United States Patent
Camarota

(10) Patent No.: US 8,081,079 B1
(45) Date of Patent: Dec. 20, 2011

(54) PLD PACKAGE WITH COORDINATED RFID TAG

(75) Inventor: Rafael Czernek Camarota, Los Gatos, CA (US)

(73) Assignee: Altera Corporation, San Jose, CA (US)

( * ) Notice: Subject to any disclaimer, the term of this patent is extended or adjusted under 35 U.S.C. 154(b) by 866 days.

(21) Appl. No.: 12/134,458

(22) Filed: Jun. 6, 2008

(51) Int. Cl.
*G08B 13/14* (2006.01)
(52) U.S. Cl. ........... 340/572.4; 340/572.1; 340/572.8
(58) Field of Classification Search .......... 340/572.1, 340/572.3, 572.4, 572.7, 572.8, 10.1, 10.3, 340/10.52; 257/627, 684, 728
See application file for complete search history.

(56) References Cited

U.S. PATENT DOCUMENTS

| | | | |
|---|---|---|---|
| 7,378,971 B2* | 5/2008 | Andrechak et al. | 340/572.7 |
| 7,838,976 B2* | 11/2010 | Yamazaki et al. | 257/684 |
| 2004/0000713 A1* | 1/2004 | Yamashita et al. | 257/728 |
| 2008/0111702 A1* | 5/2008 | Osada | 340/636.1 |
| 2011/0068438 A1* | 3/2011 | Yamazaki et al. | 257/621 |
| 2011/0181316 A1* | 7/2011 | Stewart | 326/8 |

FOREIGN PATENT DOCUMENTS
JP 2006085411 A * 3/2006
* cited by examiner

*Primary Examiner* — Van T. Trieu
(74) *Attorney, Agent, or Firm* — Womble Carlyle Sandridge & Rice, LLP

(57) ABSTRACT

A RFID tag programmed with a distinct binary code is embedded in an IC and is electrically integrated with the IC so as to establish a communication path between the RFID tag and the IC. An electronic ID for the IC is defined and coordinated to match with the binary code of the tag. The electronic ID is an active ID that is used to communicate the unique identification information of the IC to other wired electronic components.

25 Claims, 10 Drawing Sheets

(Serial Configuration Device with Passive RFID tag)

(Serial Configuration Device with Active RFID tag)

PLD PACKAGE WITH COORDINATED RFID TAG

BACKGROUND OF THE INVENTION

One of the problems associated with a manufacturing process is inventory tracking and management. A single electronic device includes a plurality of electronic components. It is important to track the various components that make up the device so that when a problem or failure occurs, it is easier to identify the problem and propose a solution in a timely fashion. Some of the ways to track the components include maintaining manual logs or providing bar codes. Manual logs are prone to errors and/or may be disparate due to differences in tracking standards employed.

Bar codes seem to address the disparity associated with the manual log by establishing a tracking standard. However, bar codes have a major disadvantage in that the bar codes have to be in the line-of-sight of a scanner in order to access the identification of each electronic component. As the device is already packaged with a plurality of components, it becomes increasingly difficult to track the various components with a bar code as some of the components may not be in the line-of-sight. One approach to address this issue is to maintain a database of components for each device during the manufacturing process and using the information provided by the database to address any problems or failures. Drawbacks to such an approach include the requirement to include the database of components with each device when shipped and the inability to make any changes to the components after they have been assembled within the device.

It is in this context that embodiments of the invention arise.

BRIEF SUMMARY OF THE INVENTION

Broadly speaking, the present invention fills these needs by providing methods and apparatus for providing an Integrated Circuit (IC), such as a programmable logic device (PLD), with a coordinated radio frequency identification (RFID) tag to uniquely identify the IC (PLD). In consumer electronics, it is essential to identify and track an electronic component within a device in order to provide proper diagnostics when a problem is encountered. Other benefits of tracking include better inventory, license and revision management. A PLD may be part of a printed circuit board (PCB) of a consumer electronics product such as a cell phone, computing system, etc. A typical PCB may include a plurality of PLDs, with a plurality of logic blocks and interconnections of each PLD laid out in multiple layers. The RFID tag enables efficient gathering of information on each PLD for identification of the PLD in an electronic component, such as a computing system, without adversely affecting users use of the computing system. The embodiments of the invention enable the PLD device to efficiently communicate a unique identification information to or from other electronic components within a device by coordinating the identification information from a passive RFID device into an active tag associated with the PLD.

Typically, RFID devices employed in consumer electronics are passive. The embodiments of the invention provide a tool to configure a binary code defining identification of a passive RFID device into a standard, non-passive electronic ID of an electronic component, so that the electronic component can be equally identified for routine maintenance and service.

Towards this end, an integrated circuit (IC), such as a PLD, is provided with an RFID tag from an RFID device. The RFID device is a passive device and includes a tag, antenna and a reader. The RFID tag, in turn, includes a chip circuit with a non-volatile memory to store a unique binary code associated with the RFID device. The unique binary code may include identification and other related information defining characteristics of the IC. The RFID tag is integrated onto the IC. The integration is done in one of two ways. In one embodiment, the RFID device is embedded onto a PCB in which the IC, such as a PLD is packaged. In this embodiment, the embedded RFID device circuit is maintained distinct from the IC (PLD circuit). The IC assembly is configured by coordinating the binary code within the wireless RFID tag of the RFID device with a wired electronic ID in the IC so that the IC assembly can be equally identified during wireless or wired communication with other electronic components integrated onto and/or outside of the PCB.

In another embodiment, the RFID device is electrically integrated into the IC, such as a PLD circuit. In this embodiment, the RFID circuit is incorporated in an input-output ring and is associated with an antenna loop circuit which is external to the IC. The antenna loop circuit can be part of the package assembly or external to the IC package assembly. The electronic ID of the IC is configured to coordinate with the binary code of the RFID so that the IC can be equally identified during wireless or wired communication with other electronic components integrated onto and/or outside of the PCB. The electronic ID provides information used, but not limited to diagnostics or inventory control, or revision control.

Other aspects and advantages of the invention will become more apparent from the following detailed description, taken in conjunction with the accompanying drawings, illustrating by way of example the present invention.

BRIEF DESCRIPTION OF THE DRAWINGS

The present invention will be readily understood by the following detailed description in conjunction with the accompanying drawings, and like reference numerals designate like structural elements.

FIG. 4A includes an RFID device with a passive tag and FIG. 4B includes an RFID device with an active tag.

FIG. 5A illustrates a Serial Configuration Device with a passive RFID tag. FIG. 5B illustrates a Serial Configuration Device with an active RFID tag. FIG. 5C illustrates a system configuration for wireless programming using serial configuration device with RFID tag.

DETAILED DESCRIPTION

Figure 1:
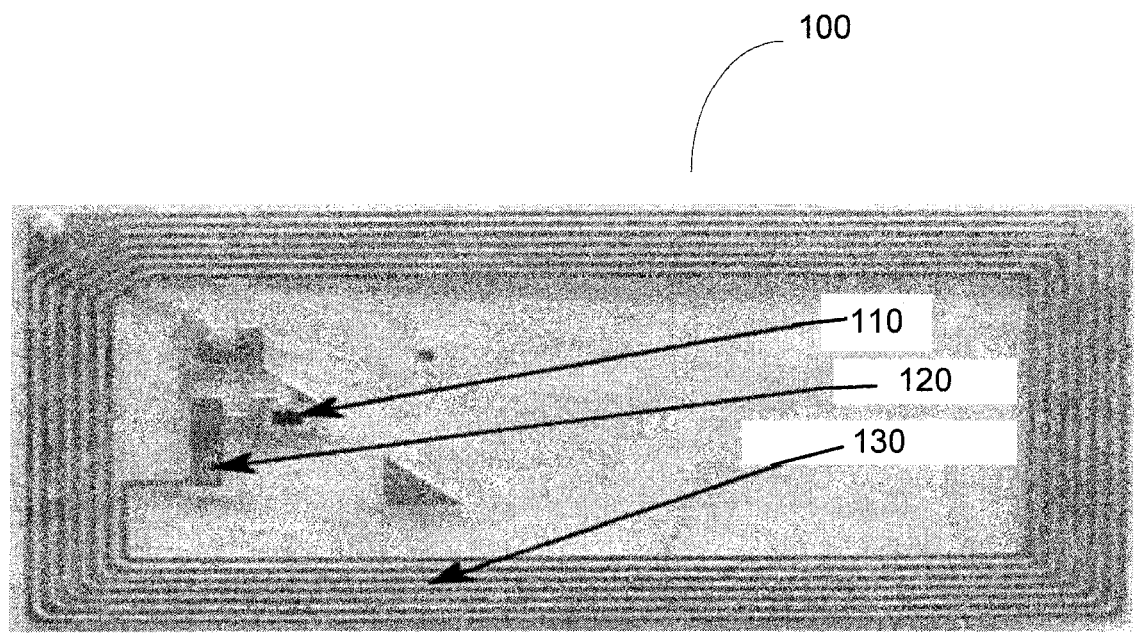
FIG. 1 illustrates a simplified top view of a standard RFID assembly associated with an IC package, in one embodiment of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

The embodiments of the invention include using a RFID device to track each of a plurality of components within an electronic assembly, such as an integrated circuit (IC). A typical RFID device includes a tag (transponder), an antenna and a reader (interrogator). The tag of the RFID device (RFID tag) includes a tag circuit and may be an active or a passive tag. An active tag includes a power source to energize the tag and keep the tag powered at all times. A passive tag is energized by an outside power source, such as a reader. The reader, in turn, may include a power source for providing energy to activate the passive tag using radio frequency (RF) signals. It should be noted that an RFID reader establishes a two way communication with the RFID tag and would more accurately be called an RFID reader/writer but common convention is to call it an RFID reader. The active tag can then be "interrogated" by the reader to obtain identification and other information programmed within the tag much faster and with lower power because the RF signal is not shared between powering of the tag and transferring of data. The active tag can also directly communicate using a digital electronic interface. This interface can be used to synchronize the RFID tag and the electronic ID of the IC. The interface can also be used to divert wireless communication between the RFID tag and a reader to enable communication between the RFID reader and the IC. This communication path could be used for programming the IC, checking status or debugging functional operation.

According to the embodiments, a passive tag of a RFID device having a unique binary code is incorporated onto an integrated circuit (IC), such as a programmable logic device (PLD). The binary code within the tag distinctly identifies the RFID device. An electronic ID is defined for the IC and is configured to coordinate with the binary code of the RFID tag. The coordination enables information, including the binary code, from a passive device to be encoded into an active electronic ID so that the electronic device is able to exchange the unique identification and other related information with other electronic devices wired to the electronic device. This eliminates the need to create and power an elaborate RFID reader to communicate the binary code to other electronic devices.

The embodiments of the invention enable the ability to read encoded information contained within a passive RFID tag through an active electronic ID to identify an IC, or any other electronic component. The RFID tag does not have to be optically visible to read the encoded information contained therein. Employing a read/write RFID tag allows for the binary code of the tag to be written and re-written, enabling the dynamic update to the tag information and the electronic ID associated with the IC is likewise read/written allowing for the binary code of the electronic ID to be written and re-written thereby enabling dynamic update to the electronic ID information, based on design changes within the IC. A non-volatile memory within the RFID tag allows for the inclusion of additional information associated with the IC as opposed to what a typical bar code would provide. The IC can be easily customized for use in any system by integrating the tag into the IC, such as a PLD, and coordinating a non-passive electronic ID of the IC with the passive RFID binary code. Further, conversion of passive ID to an active ID eliminates the need for a complex RFID reader. The passive ID is incapable of communicating with other electronic components. The active electronic ID enables the communication of the identification information associated with the IC with other electronic components to enable repair revision control and/or authentication.

FIG. 1 illustrates an overview of an RFID device 100 used to coordinate with an electronic ID of an IC, in one embodiment of the invention. The RFID device 100 is any standard passive RFID device and includes a transponder (tag) 110, an antenna (coil) 130 and an interrogator (reader, not shown). The tag 110 includes an integrated circuit with a non-volatile memory to store a unique binary code and other information associated with the tag 110. The tag 110 is communicatively connected to the antenna 130 of the RFID device through an external capacitor 120. The external capacitor 120 receives energy for energizing the tag 110 through the antenna 130. In the current embodiment, the capacitor receives radio frequency (RF) energy from a RFID reader (not shown) and uses the RF energy to power the tag 110 of the RFID device.

The interrogator or reader includes a power source to send radio frequency signals that are used to energize the tag 110 through the antenna 130. The RFID device 100 is a standard RFID device that is commercially available and is, therefore, not discussed in depth in this application. The antenna 130 associated with the RFID device 100, in this embodiment, is external to the tag 110 and acts as a transformer/receiver to receive and transmit the RF signals to and from the tag 110. One skilled in the art will appreciate that the size of the antenna 130 dictates the transmission distance of the RFID device.

Figure 2:
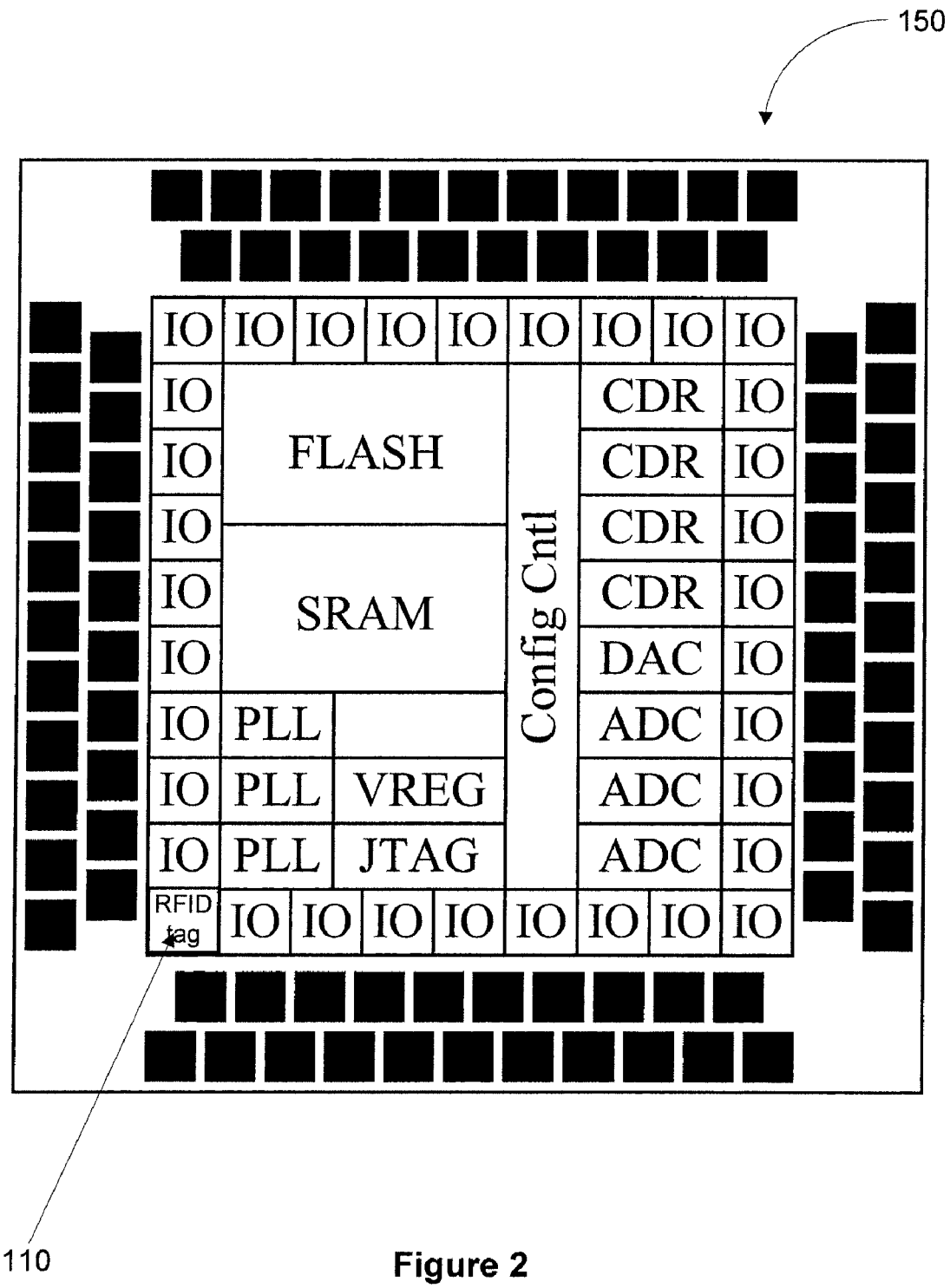
FIG. 2 illustrates a representative IC chip with an integrated RFID device, in one embodiment of the present invention.

FIG. 2 illustrates a representative integrated circuit (IC) 150 of an electronic component, such as a PLD, with an embedded RFID tag 110 of a RFID device, in one embodiment of the invention. Some of the ICs may include programmable logic devices (PLDs) such as programmable logic arrays (PLAs), programmable array logics (PALs), simple programmable logic devices (SPLDs), complex programmable logic devices (CPLDs), field programmable gate array (FPGA), etc. The IC 110 includes a core region having an array of logic blocks (sub-component circuits), surrounded by an input/output (IO) ring, in one embodiment. One exemplary IC includes a plurality of sub-component circuits including a flash memory module, a static random access memory (SRAM), phase locked loops (PLL), a voltage regulator (VREG), a configuration control, a Joint Test Action Group (JTAG) circuit, a set of analog-to-digital converter (ADC), a set of digital-to-analog converter (DAC), a set of clock-to-data recovery (CDR), and an input-output ring, comprising a plurality of input-output modules, which interfaces with components within and outside the IC. Each of the above mentioned circuits are used to process an input or output signal within the IC 150. The SRAM circuit is a memory device used to control sequential transmission of a plurality of input/output bits of large data. The PLL circuit includes a voltage or current driven oscillator to generate an oscillation signal of predetermined frequency that is constantly adjusted to match the frequency of input or output signal. A VREG circuit is used to maintain a precise voltage regardless of the current drawn by the load. A JTAG circuit is primarily used for accessing sub-blocks of integrated circuits for debugging embedded systems by providing an interface to access a debug module available to the IC 150. ADC circuit is used to convert analog data to digital signal and DAC is used to convert digital signal to analog data. A CDR circuit is used to extract clock signal from incoming data streams. It should be appreciated that FIG. 2 is exemplary and not meant to be limiting as the embodiments may be incorporated into any integrated circuit including processors, application specific integrated circuits (ASIC), etc.

An RFID tag (tag) 110 of a RFID device 100 is embedded within the integrated circuit (IC) of the electronic component at the IO ring layer by replacing one or more IO modules. In one embodiment, the tag 110 is embedded by replacing about 2-4 IO modules. The embedded tag 110 is then associated with an antenna loop circuit which is external to the IC, instead of an IO pin. The tag 110 provided at the IO ring layer of the IC 150 is a passive tag that is energized by a RF signal from a RF reader, in one embodiment. Since the RF reader, in this embodiment, is primarily used to energize and transmit RF signals to and from the tag 110, the RF reader can be a simple reader. The tag 110 is embedded by electrically integrating with the IC 150 so that a communication path may be established between the IC 150 of the electronic component and the tag 110 making the tag both active and passive. The RFID tag 110 can be part of the IC 150 and remain passive, independent and electrically isolated. The tag 110 may include a unique binary code identifying the tag 110 that is programmed at a factory during the manufacturing process or in the field by a user, such as a consumer. A coil associated with the antenna of the RFID device acts as a wireless transmitter/receiver optionally and establishes a communication path between a RFID reader and the IC 150 through the tag 110.

The binary code in the tag 110 is used to define an electronic ID for the IC 150. In one embodiment, the electronic ID is coordinated with the binary code of the tag 110 such that the identification information in the electronic ID matches the binary code of the tag 110. In another embodiment, the electronic ID of the IC is defined using a reference number representing a binary code of the tag 110. A binary code look-up table available at the IC 150 is used to identify a binary code matching the reference number in the electronic ID. Thus, the electronic ID, in conjunction with the binary code look-up table, enables reproduction of the unique binary code associated with the tag 110. In one embodiment, the binary code look-up table is stored in the non-volatile memory within the IC. Irrespective of how the electronic ID is configured, the configured electronic ID is stored in a non-volatile memory within the IC 150 and is shared by both the tag 110 and the IC 150. In one embodiment, the electronic ID is stored in a non-volatile flash memory module of the IC 150 and accessed by both the tag 110 and IC 150. In another embodiment, the electronic ID is stored in non-volatile memory, such as an erasable programmable read-only serial configuration device (EPCS), available to the IC 150. As the tag 110 is electrically integrated within the IC 150, the non-volatile memory at the tag 110 of the RFID device acts as an alternate memory module within the IC 150 and can be shared between the IC 150 and the RFID device 100, thereby providing greater flexibility. As the RFID tags 110 are passive, they are incapable of communicating directly with other electronic components. By configuring a non-passive electronic ID to coordinate with the binary code of the passive RFID tags 110, the information available in the passive RFID tag 110 can be communicated directly to other electronic components through the active electronic ID, thereby establishing the IC's 150 identity with other electronic components. The electronic ID, in addition to obtaining a unique identification code, may also obtain additional information defining one or more characteristics of the IC from the tag 110. As the tag 110 includes a memory that can include additional information, such additional information can be easily configured into the electronic ID so that the information is made available to other electronic components within a system in which the IC 150 is embedded/available. In one embodiment, the additional information may include revision information associated with the IC 150 that may be used for revision control.

The tag 110 may be dynamically updated to reflect any configuration changes within the IC 150. In one embodiment, the PLD may have a new configuration. In this embodiment, the binary code of the tag 110 and the electronic ID can be reconfigured to reflect such configuration changes. Here, the tag 110 and the electronic ID may be reconfigured using the communication path established by the transmitter/receiver of the external antenna associated with the RFID device to an RFID reader.

In yet another embodiment, the tag 110 includes encryption circuitry to encrypt the binary code associated with the tag 110. The encryption algorithm within the encryption circuitry provides a secure keycode lock for the binary code of the tag 110 that can be unlocked only by a reader equipped with a decryption algorithm. The secure keycode lock ensures that the data associated with the binary code of the tag 110 is protected from unauthorized access. Thus, using a secure keycode lock, a reader without the unlock key is prevented from accessing the data.

Figure 3B:
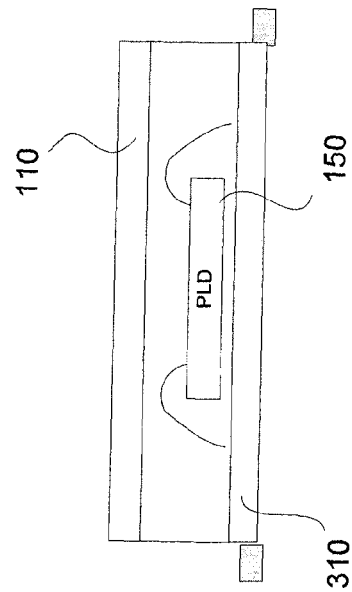
FIG. 3B illustrates a simplified side view of a combined RFID assembly in an IC package, in accordance with one embodiment of the present invention.
Figure 3A:
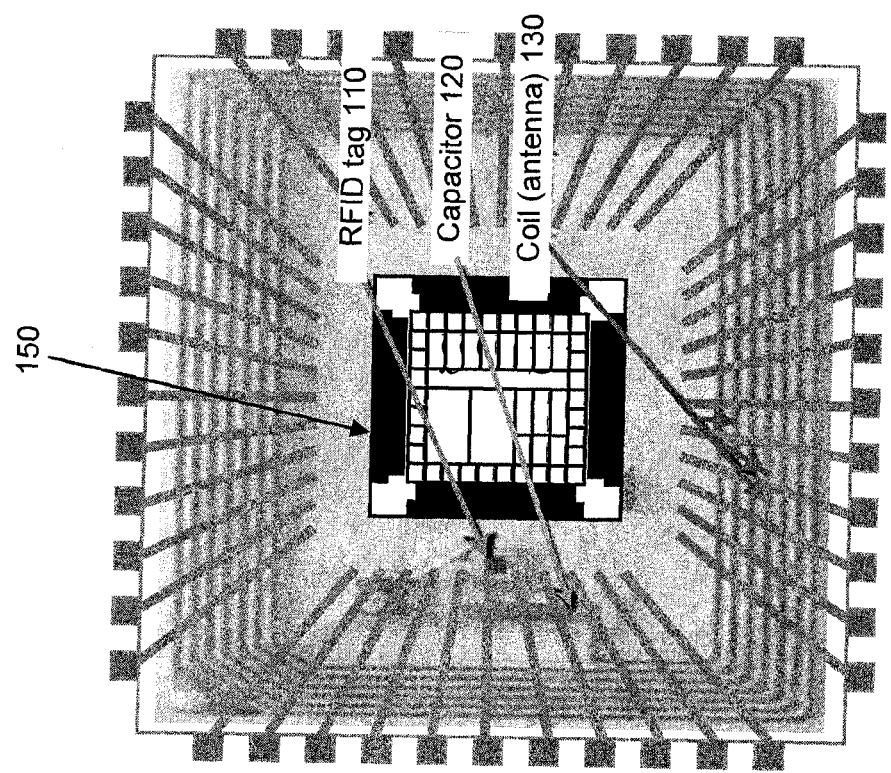
FIG. 3A illustrates a simplified top view of a combined RFID assembly and IC package, in one embodiment of the invention.

FIGS. 3A and 3B illustrate an alternate embodiment of the invention wherein the RFID tag is provided in an IC package. The embodiments in FIGS. 3A and 3B illustrate using a programmable logic device (PLD) as an IC within the IC package. However, the embodiments are not restricted to the PLD but can encompass other ICs. FIG. 3A illustrates a top view of the IC package in one embodiment of the invention. As illustrated in FIG. 3A, a PLD packaged within an IC package, such as a wire-bond package, is provided with an RFID tag from a passive RFID device. The packaging technology used in packaging an IC, such as PLD, may be any type of packaging technology including ball grid array (BGA) package, thin quad flat pack (TQFP) package, flip-chip package, wire-bond package, etc. In the wire-bond package illustrated in FIG. 3A, the IC package includes the IC chip circuit with wires leading from the PLD to the IC package. A tag 110 of the RFID device is provided at the top layer of the IC package. An external antenna 130 is also provided at the IC package. The tag 110 includes a non-volatile memory, such as an EPROM, to store a unique binary code of the RFID device 100. The binary code may be factory programmed or programmed in the field and may be reconfigured based on any configuration revisions to the PLD within the IC package. The antenna 130 may be provided in the top layer of the IC package. The antenna 130 is external to the tag 110 and is used to transmit and receive radio frequency (RF) signals to and from the RFID tag 110. A capacitor 120 communicatively connected to the tag 110 will capture radio frequency (RF) energy from a reader and energize the tag 110 to transmit and receive the RF signals. An electronic ID for the PLD within the IC package is defined by coordinating with the binary code of the tag 110. The defined electronic ID is stored in a non-volatile memory associated with the PLD contained within the IC package. The non-volatile memory of the PLD is distinct from the non-volatile memory of the tag 110 of the RFID device and is not shared with the tag 110. Any changes to the configuration of the PLD within the IC package may require updating the binary code of the tag 110. The updating of the binary code of the tag 110, in turn, will require reconfiguration of the electronic ID of the PLD to reflect the changes in the binary code of the tag 110. It should be understood that the reconfiguration of the electronic ID may be manual or automatic.

FIG. 3B illustrates a side view of the IC package illustrated in FIG. 3A. As shown, a thin board of non-conductive material acts as a substrate 310 of a printed circuit board (PCB) on which a plurality of ICs are mounted and interconnected. A tag 110 of a passive RFID device 100 is mounted in a top layer of the PLD package and is electrically integrated with the PLD within the PLD package through traces provided within the package. A chip circuit of the tag 110 of the RFID device is kept distinct from the circuit of the PLD. As a result, a non-volatile memory of the tag 110 is kept distinct from the non-volatile memory of the PLD. The tag 110 of the RFID device is programmed with a unique binary code which is stored in the non-volatile memory of the RFID tag 110. The binary code may be defined for a specific PLD package or may be defined for a custom quantity of PLD packages. The custom quantity may be determined by a user, such as a consumer, associated with the PLD 150. The binary code of the RFID tag 110 is coordinated with an electronic ID of the PLD 110. The electronic ID of the PLD 110 is stored in the non-volatile memory of the PLD 150. Unlike the passive tag that cannot communicate with other electronic devices, the stored electronic ID is an active ID defining the identity of the PLD 150 and is used to communicate information about the PLD 150 with other electronic components within a system in which the PLD 150 is mounted or assembled. The active electronic ID may also include additional information defining characteristics of the PLD, such as revision numbers.

Figure 4A:
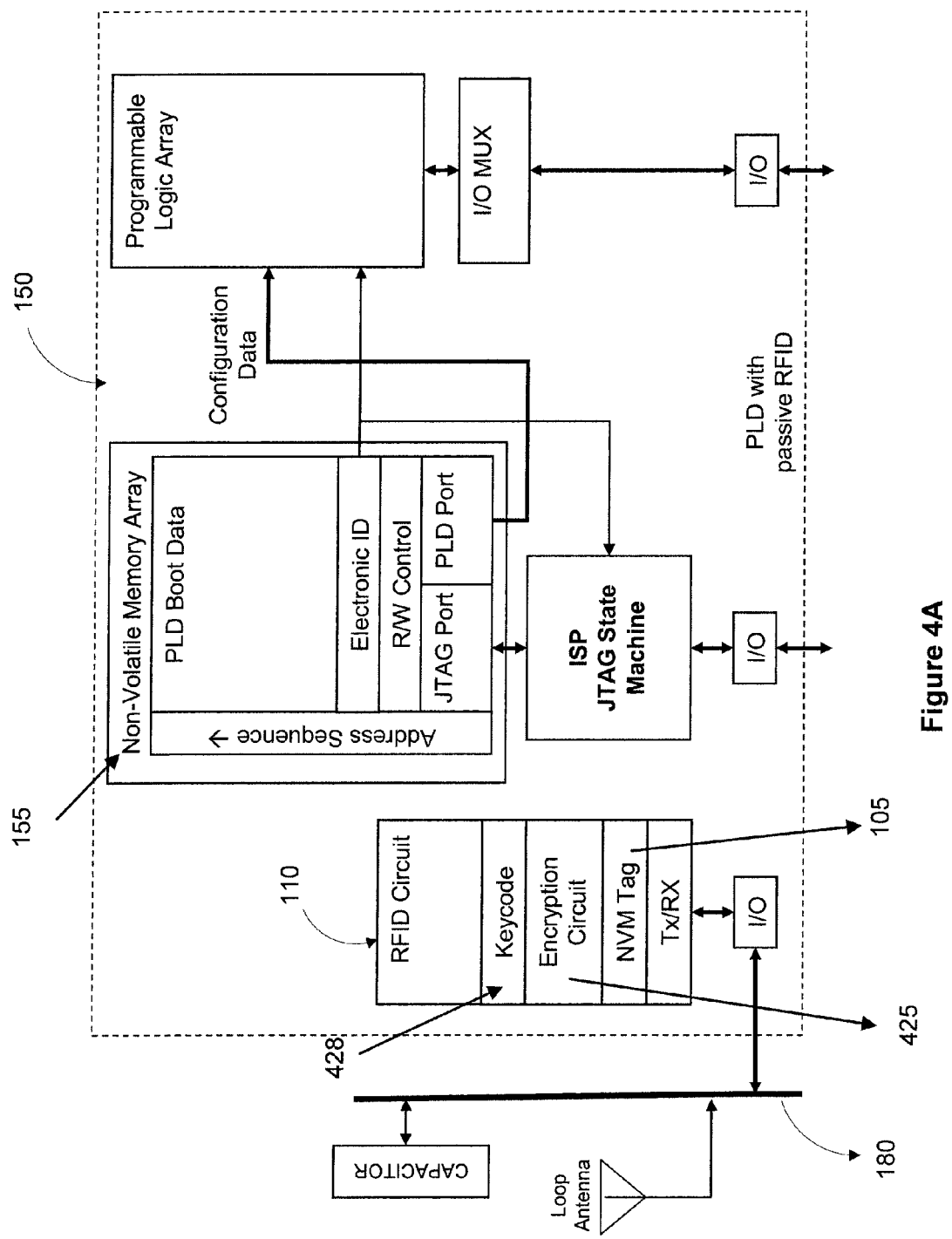
FIGS. 4A and 4B illustrates a simplified block diagram of an IC device with communication path, in one embodiment of the present invention.
Figure 4B:
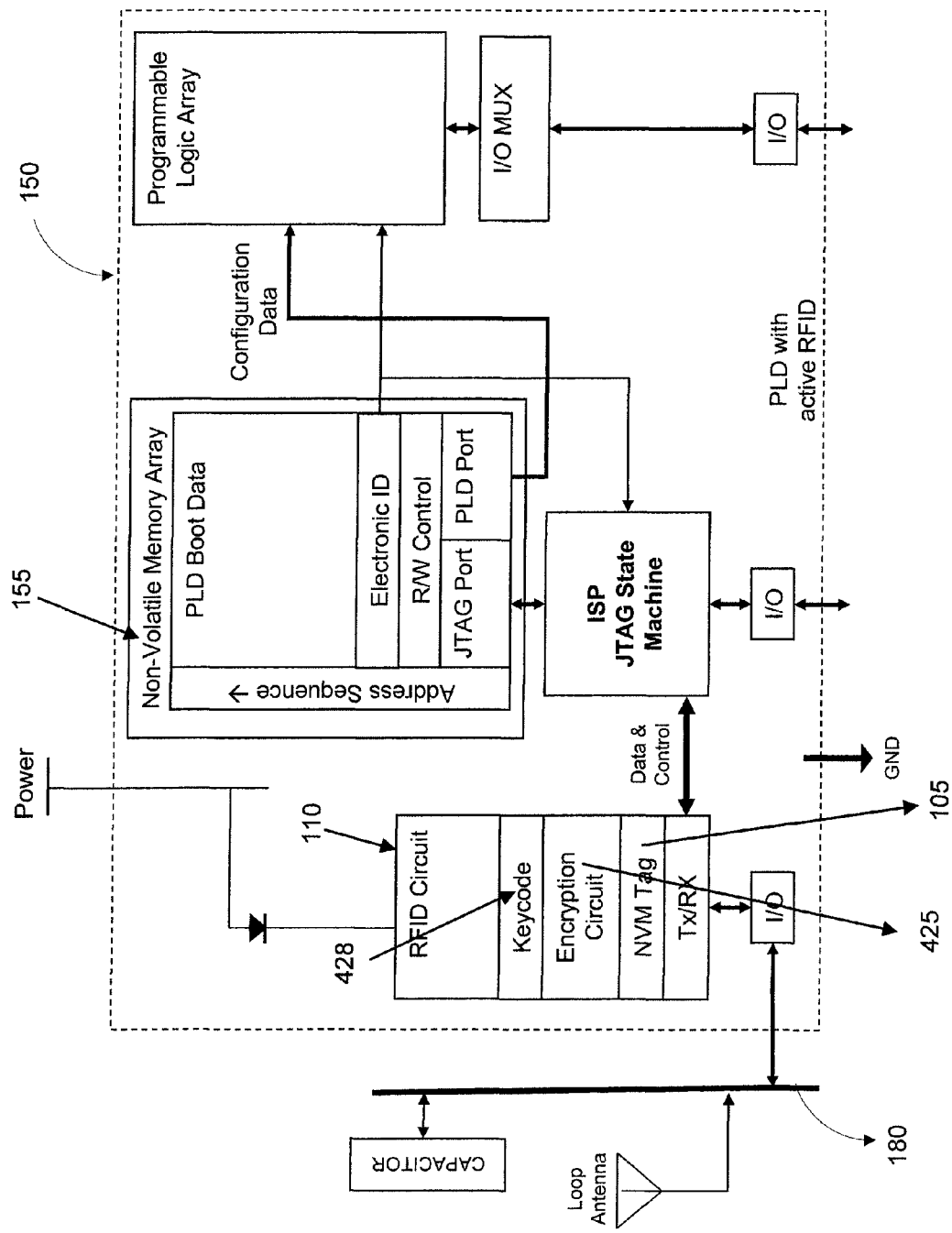

FIGS. 4A and 4B illustrate a simplified block diagram of an IC 150 with a RFID tag circuit (tag) 110 of an RFID device 100. FIG. 4A includes a passive RFID tag circuit and FIG. 4B includes an active RFID tag circuit. The RFID tag may or may not be electrically integrated with the IC. FIG. 4A illustrates a passive tag that is not electrically integrated with the IC, in one embodiment of the invention, and FIG. 4B illustrates an active tag that is electrically integrated with the IC, in another embodiment of the invention. In other embodiments, the passive tag may be electrically integrated and the active may not be electrically integrated.

Referring now to FIG. 4A, the IC 150 includes a non-volatile memory (NVM) 155 to store information about the IC 150. The electronic ID of the IC device is synchronized with the RFID device manually during the manufacturing process of the PLD.

The tag 110 is equipped with an encryption circuitry 425 that includes an encryption algorithm to provide a secure keycode 428 for securing the information within the tag 110. The binary code with the secure keycode 428 of the tag 110 is stored in a non-volatile memory tag (NVM) 105 of the tag 110. The information in the NVMs 105 is communicated through an IO module to capacitor and antenna loop circuit using a data bus 180. The RFID tag, used in this embodiment, is a passive tag energized by a reader equipped with decryption logic to unlock the secure keycode 428 in order to access the data within the tag 110. The RFID tag, in this embodiment is added to the PLD package and is not electrically integrated with the IC device. As the RFID tag has no communication or interconnection with the IC device, the binary code of the RFID device 100 may be manually synchronized with the electronic ID of the IC device during the manufacturing process of the PLD. The secure keycode 428 prevents unauthorized readers from accessing or updating the information in the tag 110, thereby enabling secure exchange of information.

Referring to FIG. 4B, the IC 150 includes a non-volatile memory (NVM) 155 to store information about the IC 150, in one embodiment of the invention. The tag 110, in this embodiment, is electrically integrated into the IC 150, e.g., as mentioned with regard to FIG. 2, thereby establishing a communication path between the tag 110 and the IC 150. As shown, the electrical integration of the tag 110 with the IC 150 is through an In-System Programmable (ISP) JTAG State Machine. The ISP JTAG State Machine is typically used to program and read information from the NVM 155 of the IC and may be used to program and read the information from the NVM 105 of the RFID tag 110 The tag, in this embodiment, is an active tag and a separate power circuit is used to power the RFID tag. In one embodiment, the power circuit may include a reverse diode to prevent power drag so that the RFID tag can operate efficiently when the IC 150 or the system in which the IC 150 is embedded, is powered down.

The tag 110 is equipped with an encryption circuitry 425 that includes an encryption algorithm to provide a secure keycode 428 for securing the information within the tag 110. The binary code with the secure keycode 428 of the tag 110 is stored in one of a non-volatile memory tag (NVM tag) 105 of the tag 110 or the non-volatile memory 155 of the IC. The information in the NVMs 105 is communicated through an IO module to capacitor and antenna loop circuit using a data bus 180. The binary code of the RFID device 100 can be updated or accessed through a RFID reader authorized to read the information in the tag. The authorized reader is equipped with a decryption key to unlock the secure keycode 428 in order to access the information related to the tag 110. The secure keycode 428 prevents unauthorized readers from accessing or updating the information in the tag 110, thereby enabling secure exchange of information. Due to a separate power supply to power the RFID tag, the RF signal from the reader is used solely for transfer of data between the tag and the reader thereby enabling faster access to information on the tag with less power.

In addition to coordinating a non-passive electronic ID for communicating identification information of the associated IC, the RFID reader may be used to program the PLD NVM itself. With the rapid advancement in technology and the current trend in developing thinner and slimmer consumer devices with increasing features, such as mobile phones, the ability to program and re-program the ICs within these devices are rapidly eroding. As the device is shrinking in size, it is becoming increasingly difficult to provide conventional cable interfaces, such as download headers, for programming the ICs. It is, therefore, advantageous to find alternate ways to program and re-program such devices without having to take the device apart. The RFID tag embedded within the IC provides an alternate way to program the sub-components (ICs) within the IC, in one embodiment of the invention. According to this embodiment, the communication path established between the RFID tag 110 and the RFID reader through the transmitter/receiver (Tx/Rx) component of the antenna, is diverted to establish communication path between the RFID reader and the IC 150 in order to program the IC 150. The Tx/Rx receives the RF signal with the programming logic from a reader, authorized to access and update information within the IC, and interfaces with the IC 150 to perform the updates.

Figure 5A:
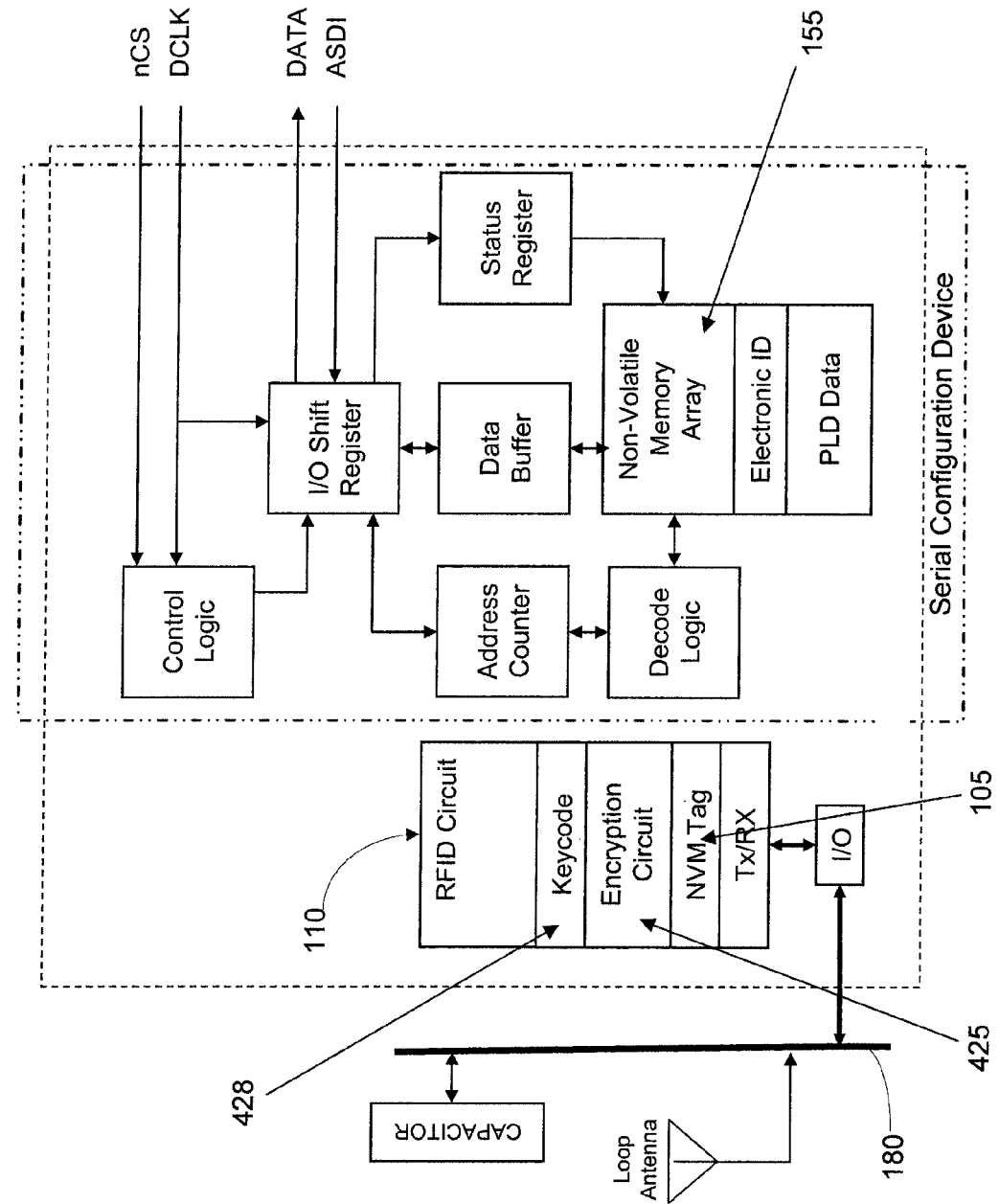
FIGS. 5A-5C illustrate a simplified block diagram of a Serial Configuration Device used to provide coordinated RFID tag for an IC, in accordance with embodiments of the present invention.
Figure 5B:
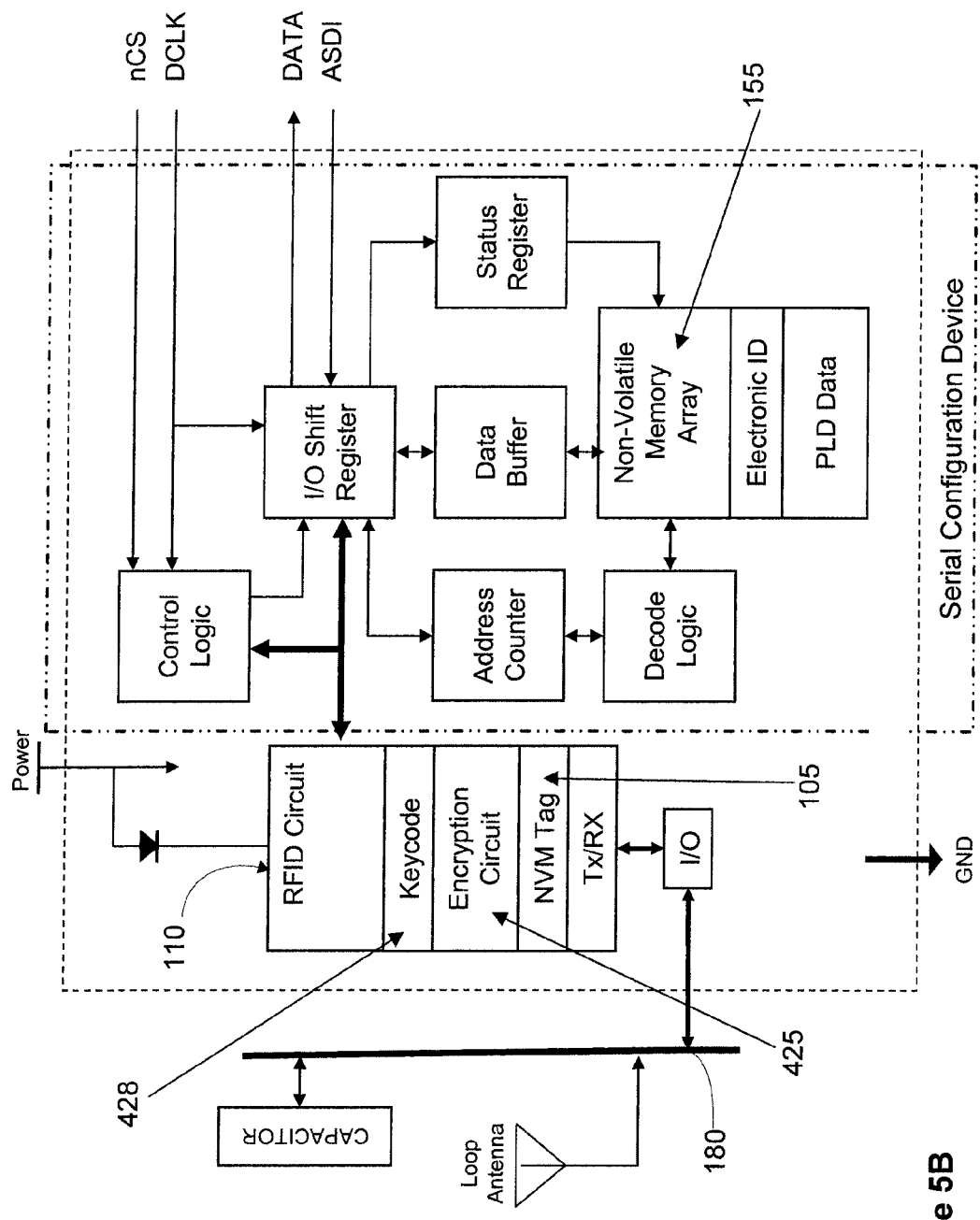

Adding RFID device circuits (including active circuits) to future PLDs is viable and provides an alternate way to resolve the space constrained configuration problem. In order to provide RFID devices to existing PLDs and/or static random access memory (SRAM) based devices, such as Field Programmable Gate Array devices (FPGAs), that may or may not include electronic ID, a configuration device may be used. As the FPGA does not include a non-volatile memory (NVM), the NVM of the serial configuration device is used in programming the IC 150. FIGS. 5A and 5B illustrate a simple serial configuration device with a RFID tag for programming the IC 150. The most common configuration device that may be used to configure the FPGA is a serial configuration device (EPCS). Since the FPGA is typically equipped with a SRAM, every time the FPGA is powered down and powered back up, it needs to be reconfigured. As a result, the serial configuration device (EPCS), such as the ones shown in FIGS. 5A and 5B, are used in configuring the FPGA. The EPCS is a simplified PLD and includes a non-volatile memory to hold the FPGA configuration along with FPGA revision. The non-volatile memory of the EPCS can be read and written by the FPGA and has enough capacity to hold an FPGA configuration pattern and an extensive electronic ID. Just as in the PLD described earlier with reference to FIGS. 4A and 4B, a passive or active RFID tag can be added to the serial configuration device, such as EPCS. It should be noted that the RFID tag of the RFID device is alternately referred to, in this application, as a tag, RFID tag or tag of the RFID device. Adding an active RFID tag to a serial configuration device enables updating of the serial configuration device wirelessly, temporarily program the SRAM configuration of the FGPA without changing the boot configuration in the serial configuration device, or retrieve functional state data from operating FPGA to do real-time diagnostics. The serial configuration device illustrated in FIG. 5A is similar in function to the PLD of FIG. 4A and includes a passive RFID tag. The serial configuration device illustrated in FIG. 5B is similar in function to the PLD in FIG. 4B and includes an active RFID tag with its own power supply having a reverse diode to prevent drag.

As shown in FIG. 5A, the RFID tag circuit is distinct from the serial configuration device and is not electrically integrated with the serial configuration device. In this embodiment, as in FIG. 4A, any configuration change at the RFID tag will have to be manually synchronized with the electronic ID within the serial configuration device.

In FIG. 5B, the RFID tag circuit (tag circuit or tag) of the RFID device is electrically integrated to the serial configuration device through an IO shift register. IO shift register is the main module through which data is brought in for programming arrays and reading the data at the serial configuration device. The RFID tag is also connected to the control logic. The control logic and IO shift register are used for bringing data in and out and to interpret the commands. As the RFID tag is electrically integrated, any change to the PLD circuit or the tag information automatically triggers the synchronization of RFID tag information with the serial configuration device.

Figure 5C:
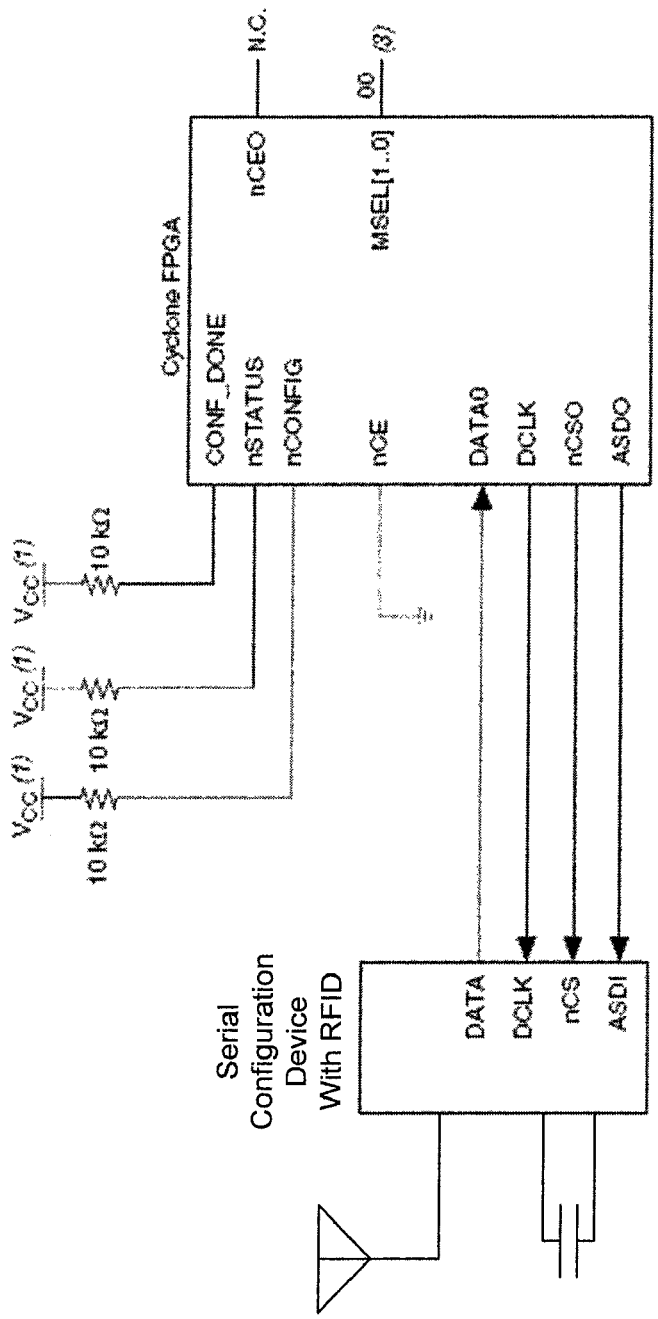

FIG. 5C highlights a small device system configuration using wireless programming Traditionally, a pin connector circuit is used in configuring the PLD. As the pin connector circuit is bulky and cumbersome, it is undesirable. Using the RFID device, as illustrated in FIG. 5C, with loop antenna and capacitor, the FPGA device can be programmed through the serial configuration device. The input data from the FPGA is transmitted to the serial configuration device wirelessly through the RFID device which establishes a wireless communication path between the FPGA and the serial configuration device.

Figure 6:
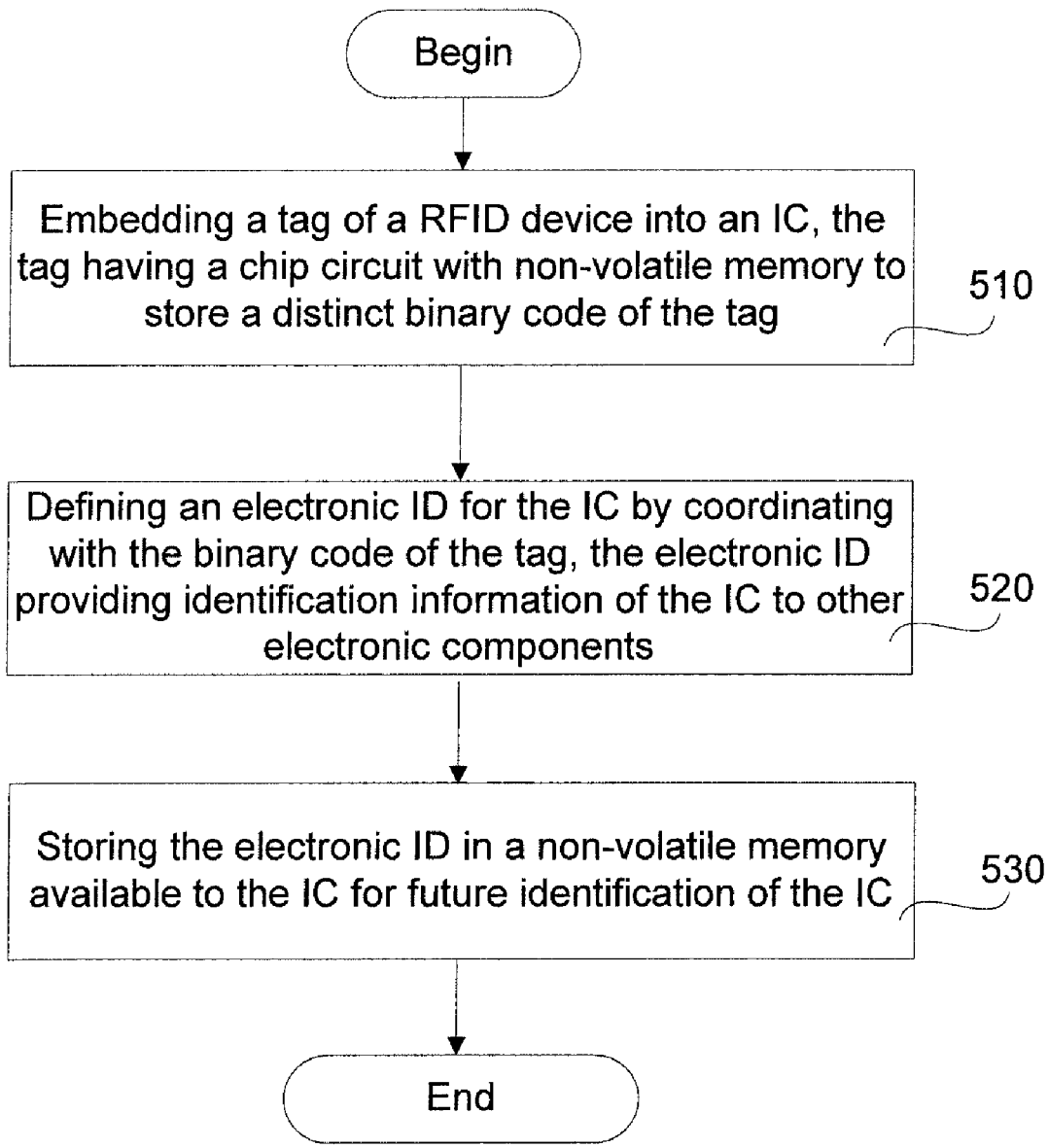
FIG. 6 illustrates a flow chart of operations involved in providing an IC with a coordinated RFID tag, in accordance with one embodiment of the present invention.

With the above detailed description of the various embodiments, a method for providing an IC, such as a programmable logic device (PLD), with coordinated radio frequency identification (RFID) tag will now be explained, with reference to FIG. 6. FIG. 6 illustrates the various process operations involved in providing an active electronic ID that is representative of a binary code of a passive RFID tag, for identifying the IC. The method begins at operation 510 wherein a tag of a RFID device with a unique binary code is embedded on the IC or in the IC assembly. The tag includes a chip circuit with a non-volatile memory to store the unique binary code of the RFID device. The tag is embedded by electrically integrating the chip circuit of the RFID device with the IC, as illustrated in FIG. 2, thereby establishing a communication path between the tag and the IC. An electronic ID is defined for the IC by coordinating with the binary code value of the tag, as illustrated in operation 520. The process concludes with the storage of the electronic ID in a non-volatile memory available to the IC, as illustrated in operation 530. The electronic ID acts as an active ID to identify the IC and is used to communicate with other wired electronic components within a system that includes the IC. In addition to the identification information, the electronic ID may also communicate essential characteristics of the IC that can be used for diagnostics, revision and license control. Thus, the process provides a way to coordinate a passive RFID device identification with an active electronic ID that can be read by any electronic component in a system to determine the identity and other characteristics of the IC.

Figure 7:
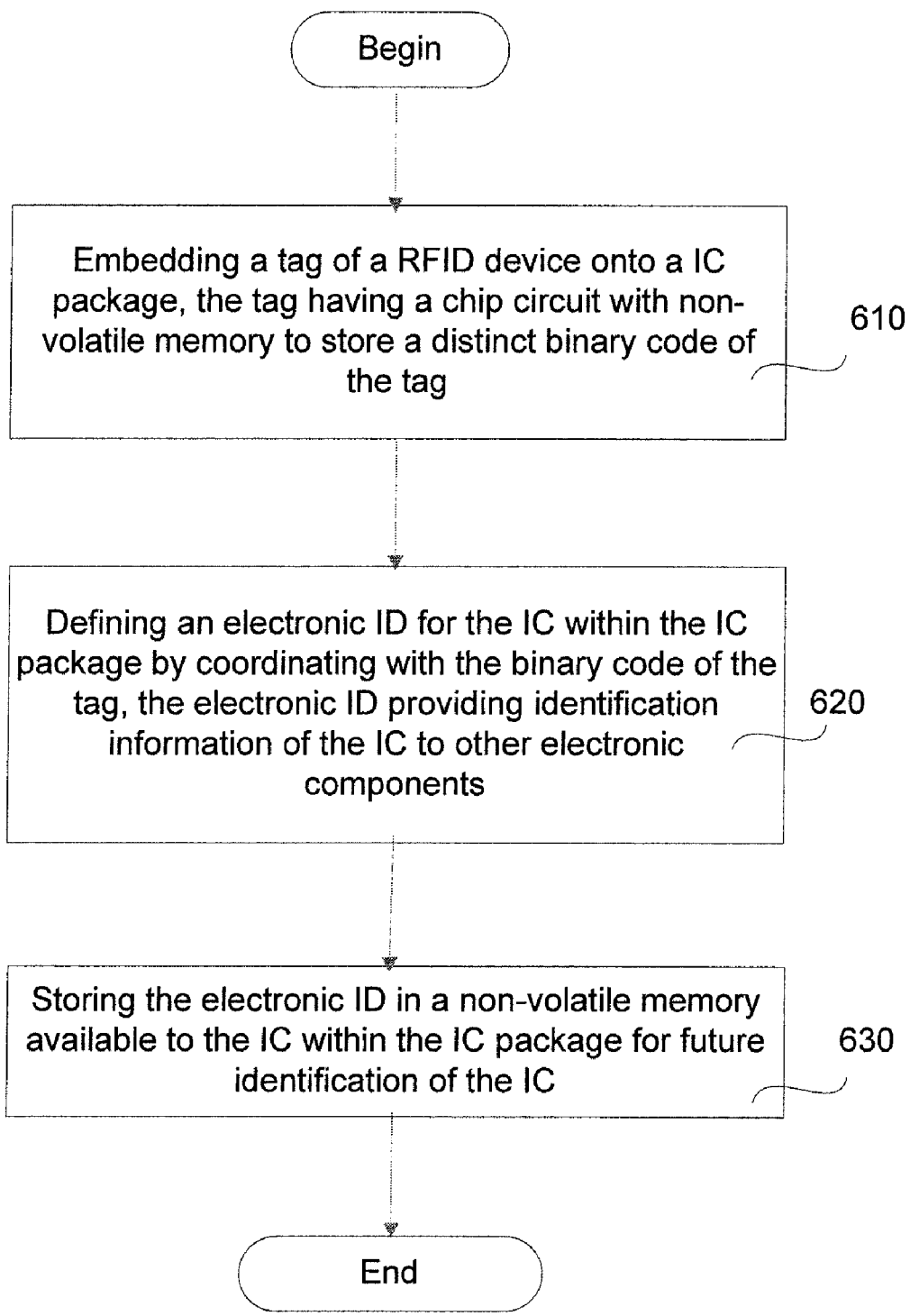
FIG. 7 illustrates a flow chart of operations involved in providing an IC package with a coordinated RFID tag, in an alternate embodiment of the invention.

FIG. 7 illustrates a method for providing an IC package, such as programmable logic device (PLD) package, with a coordinated tag from a radio frequency identification (RFID) device, in an alternate embodiment of the invention. The method begins by embedding a tag of an RFID device on the IC package, as illustrated in operation 610. As mentioned earlier, the IC package may use any packaging technology to package an IC, such as a PLD. The RFID device is a passive, read/write device with a tag, antenna and a reader. The tag includes a chip circuit with a non-volatile memory for storing identification information associated with the tag. The identification information may be a unique binary code that distinctly defines the tag. The IC package may be any one of a ball grid array package, a wire-bond package, a flip-chip package, a thin quad flat pack package, or the like. The IC package, typically, includes a thin non-conductive substrate on which a plurality of electronic components is mounted/assembled. The tag of the RFID device embedded at the top of the IC package and is electrically integrated with the IC of the IC package. An antenna of the RFID device is placed external to the tag and is also mounted at the top layer of the IC package and acts as a transmitter/receiver for transmitting and receiving radio frequency signals to and from the RFID tag. The electrical integration of the tag establishes a communication path between the tag and the IC package. As the tag of the RFID device is passive, it is unable to communicate with other electronic components actively. To facilitate transmission of the identity of the IC to other electronic components, an active electronic ID is defined for the IC within the IC package. The electronic ID is configured to coordinate with the binary code of the RFID device, as illustrated in operation 620. In one embodiment, the tag is read using a RFID reader to obtain the unique binary code stored within. The unique binary code is then used to define an electronic ID that is representative of the binary code. The electronic ID is used in communicating with other wired electronic components of a system in which the IC package is available. The process concludes with storing the electronic ID in a non-volatile memory available at the IC, as illustrated in operation 630. The electronic ID is an active ID representing the binary code in the passive tag of the RFID device so that the IC within the IC package can be identified without the use of a complex reader. Aside from identifying the IC, the active electronic ID is used to identify the characteristics of the IC within the IC package. Thus, passive tag information is defined into an active ID so that communication amongst wired electronic components can be established.

The embodiments, described herein may be employed with any integrated circuit, such as processors and programmable logic devices (PLDs). Exemplary PLDs include but are not limited to a programmable array logic (PAL), programmable logic array (PLA), field programmable logic array (FPLA), electrically programmable logic devices (EPLD), electrically erasable programmable logic device (EEPLD), logic cell array (LCA), field programmable gate array (FPGA), application specific standard product (ASSP), application specific integrated circuit (ASIC), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be the MAX 11 Z devices owned by the assignee.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A method for providing an integrated circuit (IC) with a radio frequency identification (RFID) device, comprising:
   embedding a RFID tag (tag) of the RFID device in the IC, the RFID tag including a chip circuit (tag circuit) with a non-volatile memory for storing a unique binary code;
   defining an electronic ID for the IC, the electronic ID representing the binary code of the tag available at the IC thereby enabling unique identification of the IC; and
   storing the electronic ID of the IC in a non-volatile memory available at the IC for future identification of the IC.

2. The method of claim 1, wherein embedding a tag in the IC further including,
   electrically integrating the chip circuit of the tag into the IC, the electrical integration establishing a communication path between the tag and the IC.

3. The method of claim 2, wherein the binary code in the tag is dynamically updated to reflect any configuration changes to the IC, the electronic ID dynamically configured to reflect the updated tag.

4. The method of claim 3, wherein dynamic configuration of the electronic ID of the IC further including,
   obtaining an updated binary code for the tag through a transmitter/receiver associated with the tag using the communication path;
   dynamically reconfiguring the electronic ID of the IC to reflect the updated binary code of the tag; and
   storing the updated electronic ID of the IC in the non-volatile memory shared by both the IC and the tag.

5. The method of claim 2, wherein the communication path associated with the tag is used to dynamically program the IC, the dynamic programming defining changes to a function of the IC.

6. The method of claim 1, wherein embedding a tag further includes embedding the tag in an input-output (IO) ring region of the IC, the tag associated with a loop trace circuit.

7. The method of claim 1, wherein defining the electronic ID further includes matching the electronic ID of the IC with the unique binary code of the tag.

8. The method of claim 1, wherein defining the electronic ID further includes
   defining the electronic ID using a reference number representing the binary code of the tag, wherein the reference number is used in reproducing the binary code of the tag.

9. The method of claim 8, wherein reproducing the binary code of the tag further including,
   searching a binary code look-up table to identify a binary code associated with the reference number of the electronic ID, the identified binary code from the binary code look-up table matching the binary code of the tag, wherein the binary code look-up table is available at the IC.

10. The method of claim 1, wherein the non-volatile memory is available at one of the IC or the tag and shared between the IC and the tag circuit.

11. The method of claim 1, further including,
    encrypting the binary code of the tag, the encryption of the binary code securing the identification information associated with the tag thereby preventing unauthorized access of the tag or configuration data in the IC.

12. The method of claim 1, wherein the IC is a programmable logic device or a programmable logic device configuration memory.

13. A method for coordinating radio-frequency identification device (RFID) with an integrated circuit (IC) package, comprising:
    embedding a tag of the RFID device on the IC package, the tag of the RFID device including a chip circuit with a non-volatile memory for storing a unique binary code associated with the tag;
    defining an electronic ID for an IC within the IC package to match with the binary code of the tag thereby enabling identification of the IC within the IC package; and
    storing the electronic ID of the IC in a non-volatile memory available at the IC for future identification of the IC.

14. The method of claim 13, wherein the IC in the IC package is a programmable logic device (PLD) including one of a simple PLD, a complex PLD, a field programmable gate array (FPGA) device, programmable logic device serial configuration device (EPCS), or a programmable logic device enhanced configuration device (EPC).

15. The method of claim 13, wherein embedding the tag of the RFID device further includes,
    electrically integrating the tag with the IC within the IC package, the electrical integration establishing a communication path between the tag and the IC within the IC package,
    wherein the chip circuit of the tag with the non-volatile memory is kept distinct from the IC in the IC package.

16. The method of claim 15, wherein the non-volatile memory is within the IC of the IC package and not shared with the tag.

17. The method of claim 13, further including updating the binary code of the RFID tag in response to any configuration changes of the IC, the update of the binary code of the tag triggering reconfiguration of the electronic ID of the IC within the IC package.

18. The method of claim 13, further including,
encrypting the binary code of the tag, the encryption of the binary code reflected in the electronic ID of the IC within the package, the encryption securing the identification information associated with the IC thereby preventing unauthorized access of the tag or configuration data in the IC.

19. A semiconductor packaging substrate comprising,
an integrated circuit (IC) having an electronic identification (ID); and
a RFID tag having a circuit with a non-volatile memory, the tag configured to store a distinct binary code, wherein the circuit of the tag is electrically integrated with the IC to establish a communication path between the tag and the IC, the electrical integration enabling coordination of the electronic ID of the IC with the binary code of the tag thereby enabling identification of the IC within a set of devices connected to the semiconductor packaging substrate.

20. The semiconductor packaging substrate of claim 19, wherein the tag is electrically integrated in an input-output ring within the IC such that the tag is integrated into a loop circuit, wherein the electrical integration of the tag enabling sharing of the non-volatile memory associated with each of the tag and the IC between the tag and the IC.

21. The semiconductor packaging substrate of claim 19, wherein the RFID device further includes a an antenna with a transmitter and receiver to transmit and receive radio frequency signal to and from the tag, the transmitter and receiver enabling dynamic updating of the binary code in the tag and thereby the electronic ID of the IC and to configure the IC dynamically.

22. The semiconductor packaging substrate of claim 19, wherein the IC is packaged in an IC package and the tag of the RFID device is embedded on top of the IC package, the embedded tag electrically integrated with the IC within the IC package enabling coordination of the electronic ID of the IC to match the binary code of the tag, the electrical integration establishing a communication path between the tag and the IC.

23. The semiconductor packaging substrate of claim 22, wherein the chip circuit and the non-volatile memory of the tag of the RFID device are kept distinct from the IC.

24. The semiconductor packaging substrate of claim 19, wherein the tag of the RFID device includes encryption circuitry with an encryption algorithm to encrypt the binary code associated with the tag, the encryption algorithm ensuring secure transmission of the binary code associated with the IC.

25. The semiconductor packaging substrate of claim 24, further including a reader to interrogate the tag associated with RFID device in the IC, the reader provided with a decryption algorithm to decrypt the encrypted binary code.

* * * * *